(12) United States Patent
Chrzan et al.

(10) Patent No.: US 11,668,669 B2
(45) Date of Patent: Jun. 6, 2023

(54) ELECTROCHEMICAL GAS SENSOR

(71) Applicant: Dräger Safety AG & Co. KGaA, Lübeck (DE)

(72) Inventors: Rigobert Chrzan, Bad Oldesloe (DE); Rolf Eckhardt, Hamburg (DE); Andreas Nauber, Stockelsdorf (DE); Susanne Schaefer, Lübeck (DE); Michael Sick, Timmendorfer Strand (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 645 days.

(21) Appl. No.: 16/087,368

(22) PCT Filed: Mar. 21, 2017

(86) PCT No.: PCT/EP2017/000356
§ 371 (c)(1),
(2) Date: Sep. 21, 2018

(87) PCT Pub. No.: WO2017/162332
PCT Pub. Date: Sep. 28, 2017

(65) Prior Publication Data
US 2020/0326298 A1    Oct. 15, 2020

(30) Foreign Application Priority Data
Mar. 23, 2016   (DE) .................... 10 2016 003 452.1

(51) Int. Cl.
*G01N 27/404*   (2006.01)
*G01N 27/416*   (2006.01)

(52) U.S. Cl.
CPC ......... *G01N 27/404* (2013.01); *G01N 27/416* (2013.01)

(58) Field of Classification Search
CPC ............... G01N 27/404; G01N 27/416; G01N 27/406–41; G01N 33/0004–0075
See application file for complete search history.

(56) References Cited

U.S. PATENT DOCUMENTS 4,477,403 A * 10/1984 Pust .................... G01N 27/404
                                                                 264/104
4,911,819 A *  3/1990 Holscher ............. G01N 27/404
                                                                 204/415
(Continued)

FOREIGN PATENT DOCUMENTS

CN    1114417 A    1/1996
CN    1790001 A    6/2006
(Continued)

OTHER PUBLICATIONS

Waldron (P Waldron, Surface Roughness Comparison, EDM Precision Technologies, May 1, 2016, https://edmprecision.com/surface-roughness-comparison/) (Year: 2016).*

(Continued)

*Primary Examiner* — Joshua L Allen
(74) *Attorney, Agent, or Firm* — McGlew and Tuttle, P.C.

(57) ABSTRACT

An electrochemical gas sensor measures gaseous components in an air/gas mixture. A measuring electrode and a counterelectrode, with an electrolyte located therebetween, are arranged in the sensor housing. A diffusion barrier is configured to set a gas flow of the gas intended for the concentration determination to the measuring electrode from a surrounding area. The diffusion barrier is located in the sensor housing. At least one gas-permeable, hydrophobic pressure absorption element covers the diffusion barrier and is provided between the diffusion barrier and the measuring electrode, in the interior of the sensor housing and on an inner surface of the sensor housing. The inner surface has a (Continued)

mean roughness depth $R_z$ that is lower than or equal to 2 µm at least in an area on which the pressure absorption element lies.

20 Claims, 3 Drawing Sheets

(56) References Cited

U.S. PATENT DOCUMENTS

| | | | |
|---|---|---|---|
| 6,024,853 A | 2/2000 | Kiesele et al. | |
| 6,666,963 B1 | 12/2003 | Peng et al. | |
| 7,608,177 B2* | 10/2009 | Nauber | G01N 27/404 204/424 |
| 2002/0063057 A1* | 5/2002 | Taylor | G01N 27/404 204/415 |
| 2004/0026246 A1* | 2/2004 | Chapples | H01B 1/122 204/296 |
| 2005/0229675 A1* | 10/2005 | Haupt | G01N 33/0016 73/23.2 |
| 2016/0178565 A1* | 6/2016 | Chapples | G01N 27/4074 427/58 |

FOREIGN PATENT DOCUMENTS

| | | | |
|---|---|---|---|
| CN | 101339157 A | 1/2009 | |
| CN | 102027359 A | 4/2011 | |
| CN | 102288663 A | 12/2011 | |
| DE | 2 155 935 A1 | 6/1972 | |
| DE | 2 709 903 A1 | 9/1977 | |
| DE | 32 03 362 A1 | 9/1982 | |
| DE | 43 35 409 A1 | 4/1995 | |
| DE | 196 22 931 A1 | 12/1997 | |
| DE | 197 26 453 A1 | 1/1999 | |
| DE | 696 22 470 T2 | 4/2003 | |
| DE | 10 2004 047 602 A1 | 4/2006 | |
| DE | 10 2005 020 719 B3 | 9/2006 | |
| DE | 102005026306 B4 | 7/2007 | |
| DE | 10 2006 062 051 A1 | 7/2008 | |
| DE | 10 2008 023 695 A1 | 11/2009 | |
| DE | 10 2008 024 392 A1 | 12/2009 | |
| DE | 10 2011 007 332 A1 | 10/2012 | |
| EP | 864861 A1 * | 9/1998 | ......... G01N 33/0016 |
| EP | 0864861 A1 * | 9/1998 | ......... G01N 33/0016 |
| GB | 2342168 A * | 4/2000 | ........... G01N 27/404 |
| GB | 2342168 A | 4/2000 | |

OTHER PUBLICATIONS

Ulrich et al. (EP 0864861 A1, machine translation) (Year: 1998).*
Demisch et al. (EP 0864861 A1, machine translation) (Year: 1998).*

* cited by examiner

ELECTROCHEMICAL GAS SENSOR

CROSS REFERENCE TO RELATED APPLICATIONS

This application is a United States National Phase Application of International Application PCT/EP2017/000356, filed Mar. 21, 2017, and claims the benefit of priority under 35 U.S.C. § 119 of German Application 10 2016 003 452.1, filed Mar. 23, 2016, the entire contents of which are incorporated herein by reference.

FIELD OF THE INVENTION

The present invention pertains to an electrochemical gas sensor for measuring gaseous components in an air, vapor and/or gas flow with a sensor housing, in which a measuring electrode and a counterelectrode, between which an electrolyte is located, are arranged. Further, a diffusion barrier, which is configured such that a gas flow of the gas intended for the concentration determination, which gas flow can be set specifically, can be fed to the measuring electrode, is provided in the sensor housing

BACKGROUND OF THE INVENTION

Electrochemical gas sensors, which specifically detect a gas component in a gas, air and/or vapor flow or determine a gas component concentration in the flow in question, are generally known from the state of the art. Such sensors have an electrochemical cell, in which the gas to be detected is oxidized or reduced at a measuring electrode and the ions formed in the process diffuse through an electrolyte provided in the interior of the sensor housing to a counterelectrode, where they are correspondingly reduced or oxidized. A current, which is proportional to the gas concentration of the gas to be monitored in the gas mixture, flows between the measuring electrode and the counterelectrode. The current intensity is measured by means of a measuring and analysis unit connected to the electrodes, and the percentage of the relevant gas in the gas mixture is finally determined from this. Gases or vapors, which are electrochemically reducible, e.g., oxygen and nitrogen oxides, are detected at the cathode with the above-described sensors, while gases or vapors that are electrochemically oxidizable, for example, carbon monoxide, sulfur dioxide and hydrogen sulfide, are detected at the anode.

In an electrochemical sensor for detecting oxygen, the oxygen is reduced at an oxygen cathode. The gas mixture to be monitored enters the liquid electrolyte through a diffusion barrier in the form of a diaphragm and/or a capillary and finally reaches the measuring electrode, and the diffusion barrier is configured such that the incoming gas flow is limited to a value, so that the measuring electrode operates in the limiting current range. The oxygen concentration of an electrode surface is practically zero under limiting current conditions and the limiting current is proportional to the oxygen flow, which is a function of the concentration of the oxygen in the gas to be tested.

An electrochemical sensor for detecting oxygen, which has a specially configured diffusion barrier, is known in this connection from DE 27 09 903 A1. The described diffusion barrier provides for one or more narrow ducts, which extend through an otherwise solid barrier. The barrier is configured either in the form of a porous leaf, plug or diaphragm, in the form of a simple capillary tube or else in the form of a combination of the above-mentioned alternatives.

Further, an electrochemical sensor for measuring gaseous components in a gas mixture, which has a sensor housing, in which a measuring electrode, a counterelectrode and also a reference electrode are arranged in an electrolyte, is known from DE 2 155 935. Such three-electrode sensors are used to detect different components in gas mixtures, especially in ambient air, in order to detect harmful substances, e.g., hydrocarbons, carbon monoxide or nitrogen monoxide, but also breath alcohol in gas mixtures. The reference electrode is connected to a potentiostat and generates a constant potential at the measuring electrode, so that a drift of the sensor signal is said to be prevented.

If an electrochemical sensor is used to detect oxygen in a gas mixture, the measuring electrode, at which the oxygen is reduced, shall be sufficiently polarized in order to operate with certainty in the limiting current range, in which the value of the limiting current is independent from the potential. At the same time, it must not be excessively polarized in order to reliably prevent the formation of hydrogen, which could lead to a distortion of the measured oxygen values. To guarantee a corresponding operation of the measuring electrode, in this case of the cathode, the electrode material must be selected to be such that a suitable operating potential is set between the cathode and the anode. The use of precious metals, e.g., gold, platinum, palladium, etc., or carbon for the measuring electrode and the counterelectrode proved to be advantageous in this connection.

If the potential of the anode has a comparably high operating potential level, a potentiostat is necessary to polarize the oxygen cathode sufficiently far into the limiting current range. The voltage applied must, in turn, be maintained now below a value that would polarize the cathode up to the range in which hydrogen is formed.

As the above explanations show, it is of particular significance that the measuring electrode is supplied with the correct volume flow of the gas to be tested in order for this electrode to operate in the limiting current range. The use of capillaries or special duct structures, possibly in combination with diaphragms, proved to be advantageous in this connection. It is, however, problematic in connection with the use of diffusion barriers that have at least one capillary in an electrochemical sensor for detecting gases that pressure waves may build up within the capillary and they may propagate to the measuring electrode due to pressure surges caused by these pressure waves. Such pressure surges bring about, at least briefly, a change in the partial pressure of the gas to be detected at the measuring electrode and therefore they regularly lead to signal transients of the gas sensor and may thus be the cause of false alarms. Pressure surges, which propagate beginning from the capillary of the diffusion barrier to the measuring electrode, regularly lead to a drift of the measured values especially in electrochemical sensors with which the percentage of oxygen shall be determined in air, in a gas mixture or in a vapor.

SUMMARY OF THE INVENTION

Based on the electrochemical sensors known from the state of the art for the detection of the percentage of a selected gas, especially oxygen, in air, in a gas mixture or in a vapor, in which sensors the diffusion barrier has a capillary, a basic object of the present invention is to provide a technical solution, which prevents or at least minimizes adverse effects based on pressure surges, which propagate through the capillary up to the measuring electrode.

The technical solution to be provided shall also be able to be integrated in the prior-art configuration of an electrochemical sensor in a comparatively simple manner. In particular, the design effort and the manufacturing effort shall be reduced compared to the prior-art sensors by simple actions. The technical configuration of the technical solution to be provided should be characterized in that the effort needed during the manufacture of a corresponding electrochemical sensor to introduce a corresponding protective device for minimizing pressure surges, which may affect the measuring electrode, into the sensor housing is minimized and higher product safety, especially increased safety during the mounting of the sensor, is achieved.

The above-mentioned object is accomplished with an electrochemical gas with technical features according to the invention. Advantageous embodiments of the present invention will be explained in more detail in the following description, partly with reference to the figures.

The present invention pertains to an electrochemical gas sensor for measuring gaseous components in air, in a gas mixture and/or in a vapor with a sensor housing, in which a measuring electrode and a counterelectrode, between which an electrolyte is located, are arranged. Further, a diffusion barrier, which is configured such that a defined gas flow of the gas intended for the concentration determination can be fed to the measuring electrode from a surrounding area, is located in the sensor housing. To achieve the feeding of the gas to be measured in a specific manner, the diffusion barrier has at least one capillary. An electrochemical gas sensor configured according to the present invention is characterized in that at least one gas-permeable, hydrophobic pressure absorption element, which covers the capillary in the interior of the sensor housing and which lies on an inner surface of the sensor housing, is provided between the capillary of the diffusion barrier and the measuring electrode, wherein the inner surface, on which the pressure absorption element lies and which may also be called contact surface, has at least partly a surface that has a mean roughness depth $R_z$ that is lower than or equal to 2 µm, especially preferably smaller than or equal to 1 µm, and especially preferably smaller than or equal to 0.5 µm. In a very special embodiment, a surface is provided, which has a mean roughness depth $R_z$ that is lower than or equal to 0.25 µm. The mean roughness depth $R_z$ is defined in the sense of the present invention as a mean roughness depth $R_z$ according to DIN EN ISO 4287 or ASME B46.1. Here, the mean roughness depth $R_z$ is the arithmetical mean of the individual roughness depths $R_z$ of a plurality of, especially five, consecutive individual measured sections according to the formula $R_z = 1/n \ (R_{z1} + R_{z2} \ldots R_{zn})$.

The individual roughness depth $R_{zi}$ of an individual measured section is the sum of the height of the greatest profile peak and the depth of the greatest profile valley of the roughness profile within an individual measured section in this case. The corresponding determination of the mean roughness depth according to DIN EN ISO 4287 or ASME B46.1 is shown graphically in FIG. 1 for better illustration.

In a special embodiment, at least the element of the sensor housing, which has, for example, the shape of a pot-shaped cap or cover and on the especially smooth surface of which the pressure absorption elements lies in the mounted state, comprises a plastic. At least this element of the sensor housing is preferably manufactured by means of an injection molding process, wherein the part of the injection mold that is located opposite the smooth surface or with which the smooth surface of the injection mold is in contact at least briefly during the manufacturing process, was specially smoothed, especially by grinding, polishing, lapping and/or flat honing. Polishing of the mold surface, performed to manufacture such a suitable sensor housing part, proved to be especially suitable.

According to a special embodiment of the present invention, the pressure absorption element is configured in the form of a gas-permeable disk, which covers the capillary on an inner side of the sensor housing and lies on an inner surface of the sensor housing such that the capillary opening located in the interior of the sensor housing is surrounded by the pressure absorption element over the entire circumference. In an especially preferred manner, the gas-permeably configured pressure absorption element, especially in the form of a disk, comprises a thermoplastic fluoroplastic, for example, polyfluoroethylene propylene (FEP) or polytetrafluoroethylene (PTFE). It is likewise conceivable, as an alternative or in addition, to use glass or quartz fiber nonwovens, silicate, especially aluminosilicate or carbon, for the pressure absorption element. The pressure absorption element preferably has at least one aluminosilicate molding (molded part) and/or at least one carbon nonwoven molding. It is essential for the configuration of the pressure absorption element that the opening of the capillary in the interior of the sensor housing is covered, so that gas, especially the gas to be tested, can diffuse rapidly and a resistance is nevertheless generated for the passage by the gas-permeable pressure absorption element. Furthermore, it is essential that the pressure absorption element does not absorb any liquid, and it is irrelevant in this connection whether the liquid is a liquid penetrating into the sensor housing from the outside or liquid of the electrolyte present in the sensor housing.

It is conceivable in reference to the capillary, which is provided in the diffusion barrier, that it is a single capillary, a plurality of capillaries or a suitably configured duct structure. According to another preferred embodiment, the diffusion barrier has, in addition to the capillary or to a correspondingly suitable duct structure, at least one additional, gas-permeable component, for example, in the form of a porous component, which limits the incoming gas flow into the interior of the sensor housing to the measuring electrode to a desired value. Such an additionally provided gas-permeable component is arranged in a suitable manner on the outer side of the sensor housing and is connected fluidically in series with the capillary and/or with the duct structure.

According to another embodiment of the present invention, a reference electrode is provided in the interior of the sensor housing. The potentiostat generates a constant potential at the measuring electrode by means of the reference electrode and prevents a drift of the sensor signal in this manner. In a preferred manner, the measuring electrode, the counterelectrode and the reference electrode are connected in this case via electrical contact lines to a measuring and analysis unit, in which a potentiostat is integrated. The potential of the measuring electrode is preferably maintained at a value between −0.3 V and −0.9 V relative to the potential of the counterelectrode. A reduction of atmospheric oxygen within the sensor can be reduced in this manner to the extent that the current generated by the oxygen/water redox system is insignificant compared to the current generated by the reaction of the contaminant. By providing two electrodes and a reference electrode, which is connected to a potentiostat, it is ensured that the current flowing between the measuring electrode and the counterelectrode is proportional to the concentration of the gas to be detected in the overall gas flow.

That the pressure absorption element can absorb pressure surges that would usually propagate to the measuring electrode in a preferred manner in such a suitable manner is surprising because it contradicts the hitherto valid theory, namely, the transportation of substances by pressure surges or due to disturbances in the transportation of substances by pressure surges in the capillary. It was thus assumed until now that air flows through the capillary to the measuring electrode of the oxygen sensor and the percentage of oxygen in the air is reduced at the measuring electrode and the now oxygen-free remaining air now flows against to the outside against the fresh air flowing in. It should be considered in this connection that pressure surges are mechanical longitudinal waves, which move unhindered through the capillary. The fluctuations in the oxygen partial pressure, which occur at the measuring electrode and which follow from the development of such pressure surges, thus can lead to signal transients. It was hitherto assumed that these longitudinal waves in the capillary interfere with the flow equilibrium between air flowing in and air flowing out of the sensor and that pressure surges must therefore be abolished or reduced before the capillary is reached to the extent that there will be no disturbance in the flow equilibrium in the capillary. The pressure absorption element provided according to the present invention prevents the propagation of pressure surges to the measuring electrode by the rapid propagation of the pressure surges being delayed, so that the wave minimum or wave valley will finally reach the measuring electrode, where the pressure surge will be extinguished, together with the wave maximum or wave crest.

The present invention is based precisely on providing a pressure absorption element on the inner side of the sensor housing, and this pressure absorption element covers the capillary. The pressure absorption element provided according to the present invention is thus located between the outlet of the capillary on the inner side of the sensor housing and the measuring electrode. This arrangement has not only the advantage that an especially suitable damping of occurring pressure surges is achieved, but rather that advantages will arise in relation to the manufacture of an electrochemical sensor. These advantages can be attributed especially to the fact that the pressure absorption element can now be fixed with the measuring electrode on the inner side of the sensor housing in front of the capillary and the usually occurring working step, in which a corresponding pressure absorption element is bonded with an adhesive pad to the sensor housing from the outside, covering the capillary, is thus eliminated. Such a bonded pressure absorption element has, further, the drawback that it can easily be removed, which leads to an extremely unstable operation of the oxygen sensor with the above-described consequences. The manufacture of an electrochemical sensor, which is made possible by the technical solution according to the present invention, thus leads to a greater safety during the assembly and hence to higher product safety. In a preferred manner, the sensor housing therefore has a housing cap, which is manufactured by means of an injection molding process, and in which the pressure absorption element is fixed together with the measuring electrode on the inner side of the housing cap.

It is essential for the technical solution according to the present invention that the inner surface of the sensor housing, which is in contact with the pressure absorption element, has an especially smooth surface. A mean roughness depth $R_z$ of this surface with a value that is lower than 5 µm proved to be especially advantageous. Special results are obtained concerning the buffering or extinction of pressure surges as soon as the mean roughness depth $R_z$ of the surface assumes a value that is lower than 1 µm.

The present invention will be described below without limitation of the general inventive idea with reference to the figures on the basis of special embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
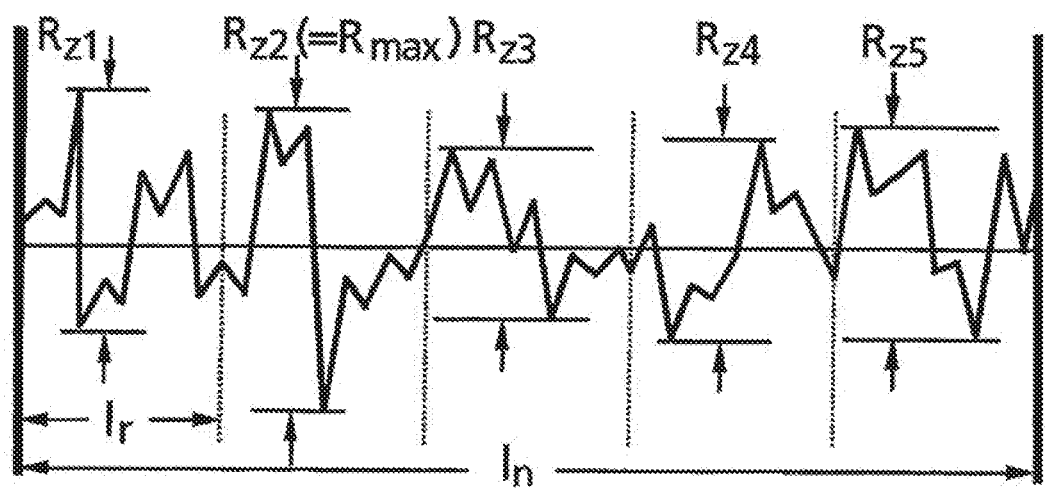
FIG. 1 is a graphic representation of the determination of the mean roughness depth $R_z$.

Referring to the drawings, FIG. 1 shows in a graphic representation the determination of the mean roughness depth $R_z$ according to DIN EN ISO 4287 or ASME B46.1. The mean roughness depth $R_z$ is the arithmetic mean of the individual roughness depths $R_{zi}$ of a plurality of consecutive individual measured sections according to the formula $$R_z = 1/n \ (R_{z1} R_{z2} + \ldots + R_{zn}).$$

The individual roughness depths $R_{zi}$ of five individual measured sections are preferably measured for the determination of the mean roughness depth $R_z$. As can be seen in FIG. 1, the height of the highest profile peak and the depth of the greatest profile valley of the roughness profile are determined on the individual measured sections in relation to the mean profile line and the individual roughness depths $R_{zi}$ are calculated from this.

Figure 2:
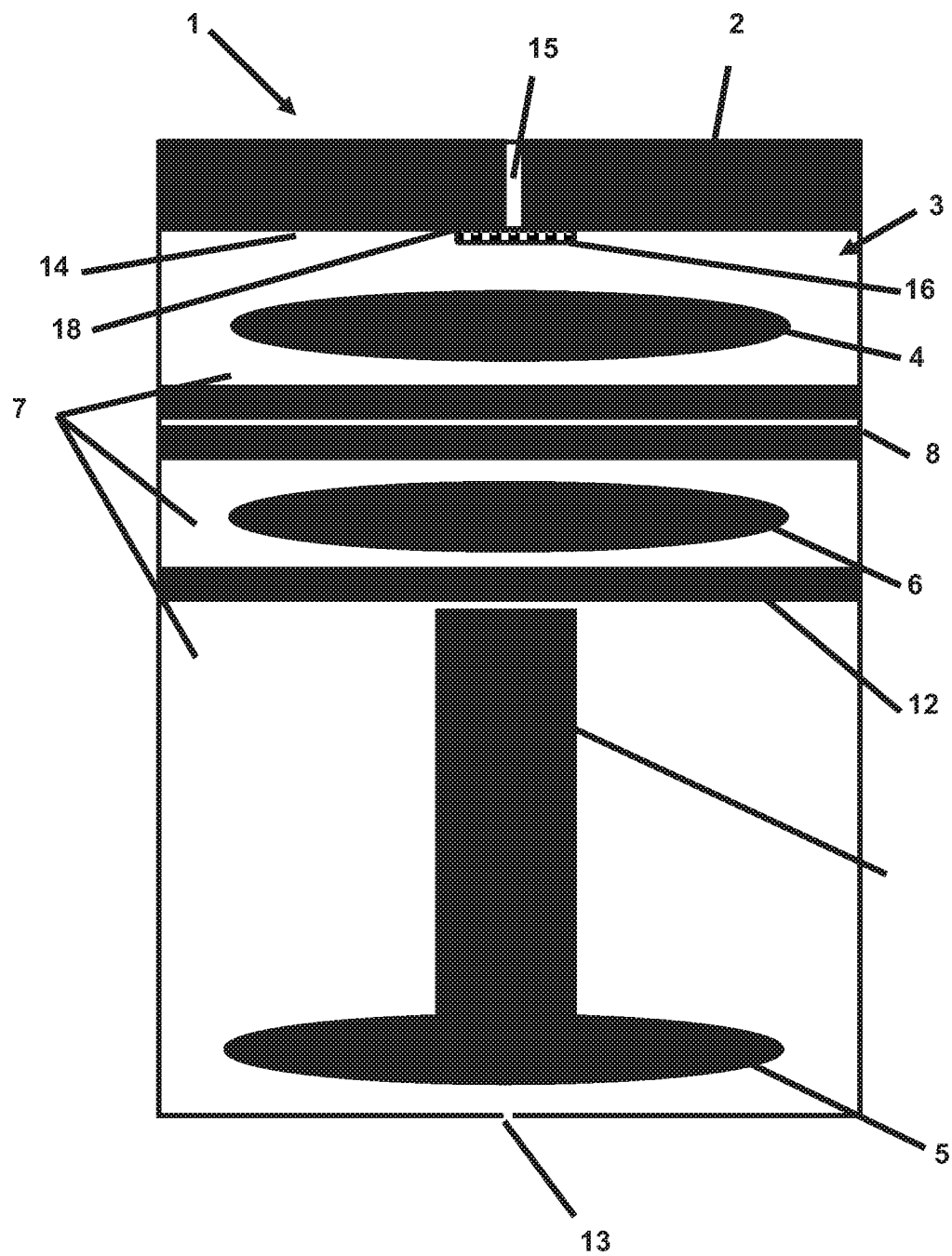
FIG. 2 is a schematic view of an oxygen sensor configured according to the present invention.

FIG. 2 shows in a schematic view the configuration of an electrochemical sensor 1 configured according to the present invention for the detection of the percentage of oxygen in a gas mixture. The electrochemical sensor 1 has a sensor housing 2, in the interior 3 of which a measuring electrode 4, a reference electrode 6 as well as a counterelectrode 5 are arranged within an electrolyte 7. The electrodes 5, 6, 7 are electrically connected to one another through the electrolyte. The measuring electrode 4 as well as the counterelectrode 5 consist of a precious metal-containing material.

The measuring electrode 4 as well as the reference electrode 6 and the counterelectrode 5 are separated from one another by a separator nonwoven 8, through which the ions formed at the measuring electrode 4 during the reduction of the oxygen present in the air to be monitored can diffuse. Based on the reduction of the oxygen taking place at the measuring electrode 4 as well as on the oxidation of the ions diffusing to the counterelectrode, which oxidation takes place at the counterelectrode, a flow of current is generated between the measuring electrode 4 and the counterelectrode 5. The value of this current flow is proportional to the percentage of oxygen in the air entering the interior 3 of the sensor.

Both the measuring electrode 4 and the counterelectrode 5 are connected to a measuring and analysis unit 9, which detects the current flowing between the two electrodes 4, 5 and determines from this the percentage of oxygen in the gas mixture being tested. It is taken into consideration that the percentage of oxygen is proportional to the current flowing between the two electrodes 4, 5. Furthermore, the reference electrode 6 is likewise connected to the measuring and analysis unit 9, and a potentiostat 10, which is integrated in the measuring and analysis unit and ensures that a potential between –0.3 V and –0.9 V is set at the measuring electrode 4 by means of the reference electrode 6, is provided. Fluctuations of the measured signal are thus reliably avoided.

Furthermore, another separator nonwoven 12 and a wick 11 are provided between the reference electrode 6 and the counterelectrode 5.

Further, a pressure equalization opening 13, through which especially the oxygen formed at the counterelectrode 5 based on the oxidation can escape, is arranged on the underside of the sensor housing 2 under a counterelectrode 5. The pressure equalization opening 13 is preferably covered by a gas-permeable diaphragm It is essential for the present invention in the electrochemical sensor 1 shown in FIG. 2 that a pressure absorption element 16, which can reliably absorb pressure surges, which would propagate through the capillary 15 and act on the measuring electrode 4, is provided on an inner side 14 of the sensor housing 2 between the measuring electrode 4 and the opening of the capillary 15, which opening is located on this side. The pressure absorption element 16 is configured in the form of a gas-permeable, hydrophobic disk consisting of polytetrafluoroethylene (PTFE). The capillary 15 is covered by the pressure absorption element 16 over an entire capillary circumference (over dimensions of an entire capillary opening).

Figure 3:
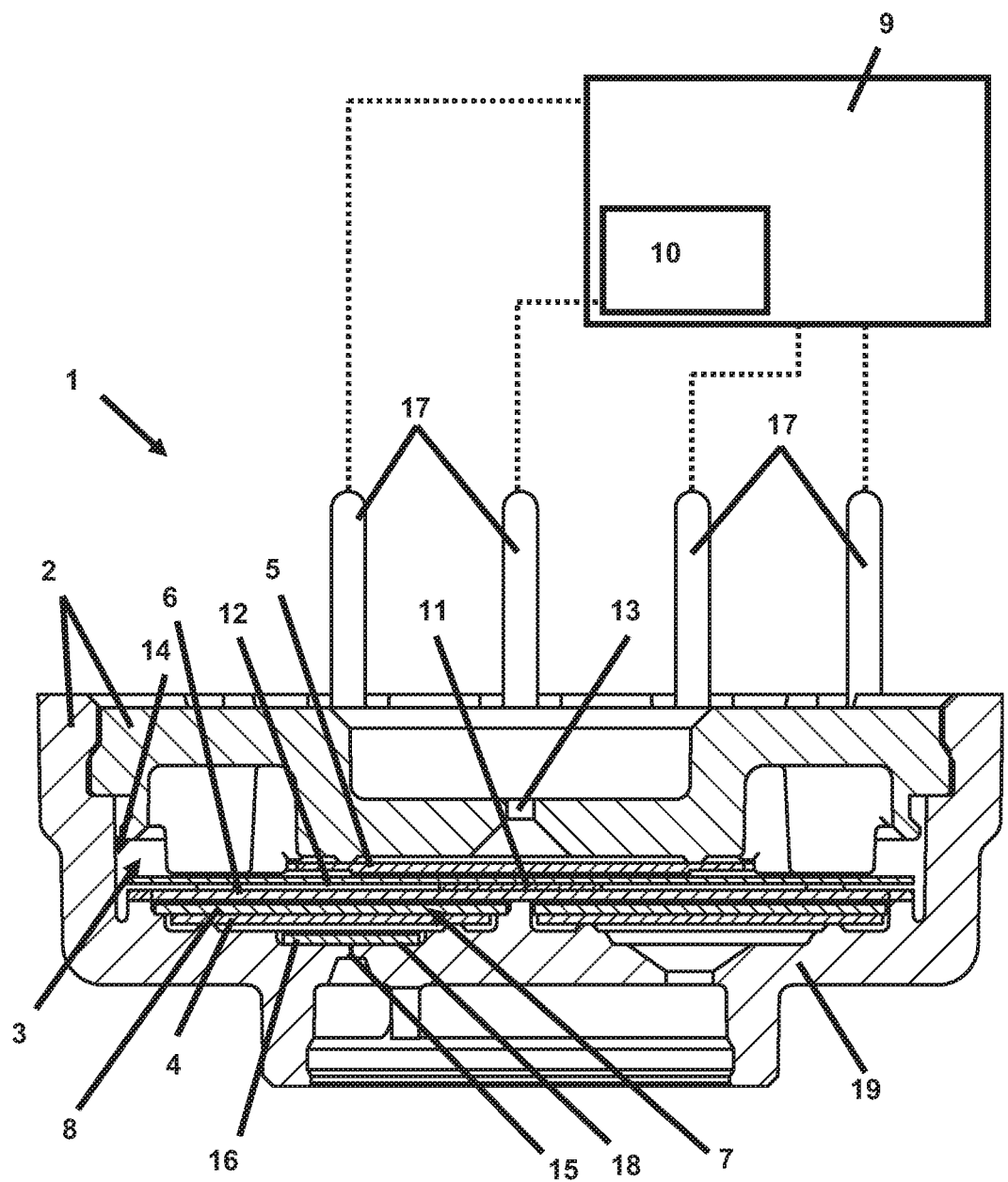
FIG. 3 is a sectional view of an electrochemical oxygen sensor configured according to the present invention.

FIG. 3 shows in a sectional view an electrochemical sensor 1 configured according to the present invention for the detection of oxygen in an air flow. Oxygen-containing air flows in the position of the sensor 1 as shown in FIG. 3 from the bottom into the interior 3 of the sensor housing 2, in which the electrodes 4, 5, 6 are arranged in an electrolyte 7, as a result of which a flow of current is generated, as will be described below. The needed electrical contacts 17, via which the electrodes 4, 5, 6 provided in the interior of the sensor housing 2 are connected to a central measuring and analysis unit 9 in an electrically conductive manner, are shown on the top side of the electrochemical sensor 1 shown in FIG. 3.

During the operation of the sensor 1, oxygen-containing air flows through the diffusion barrier, which is provided in the sensor housing 2 and comprises a capillary 15, into the interior 3 of the sensor. A measuring electrode 4, a reference electrode 6 as well as a counterelectrode 5, which are surrounded by an electrolyte 7, are provided in the interior of the sensor housing 2. A separator nonwoven 8, through which the ions formed during the reduction of the oxygen at the measuring electrode 4 can diffuse to the counterelectrode 5, is provided between the measuring electrode 4 and the reference electrode 6. A wick 11, which is likewise impregnated with the electrolyte present in the sensor housing 2 and establishes a distance between the reference electrode 6 and the counterelectrode 5, is provided between the reference electrode 6 and the counterelectrode 5. The reference electrode 6 is currentless during the operation of the electrochemical sensor 1, so that neither ions nor electrolyte flow at this electrode. The potential of the measuring electrode 4 is measured against the reference electrode 6, while the current is flowing to the counterelectrode 5. The potential is maintained in this case at a stable level, because the potential does not have to be equalized by a flow of current. This is also the reason for the comparatively great distance between the reference electrode 6 and the measuring electrode 4 as well as the counterelectrode 5.

Oxidation of the ions arriving from the measuring electrode 4, during which the oxygen which can escape from the sensor housing 2 via the pressure equalization opening 13 is formed, takes place at the counterelectrode 5. The pressure equalization opening 13 is separated from the surrounding area by a suitable gas-permeable diaphragm or a corresponding component. A gas-permeable diaphragm, which is connected fluidically in series with the capillary 15, is also provided on the side via which oxygen enters the sensor housing 2.

The provision of a pressure absorption element 16 on the inner side 14 of the sensor housing 2, which covers the capillary 15 over the entire area thereof, is essential for the present invention. The pressure absorption element 16 is a disk, which is manufactured from PTFE (polytetrafluoroethylene). The pressure absorption element 16 is configured such that pressure surges, which propagate through the capillary 15 and would reach the measuring electrode 4, are buffered or absorbed in a suitable manner.

To guarantee sufficient buffering or extinction of such pressure surges, it is essential that the inner surface 18 of the sensor housing 2, on which the pressure absorption element 16 lies, has an especially smooth surface. In the exemplary embodiment shown in FIG. 3, the sensor housing 2, especially the lower pot-shaped part 19, is an injection molding, in which the inner surface 18, on which the pressure absorption element 16 lies, has been polished. Based on the polishing of this surface 18, the surface has a mean roughness depth $R_z$ that assumes a value of about 1 μm. Especially good values are attained in this range in respect to the buffering or extinction of occurring pressure surges. Experiments have demonstrated in this connection that a comparatively good buffering of pressure surges can be attained even in case of a surface that has a mean roughness depth $R_z<5$ μm. The ability of the pressure absorption element to absorb pressure surges can be increased further if a surface, that has a mean roughness depth $R_z$ between 0.1 μm and 1 μm, is prepared. However, the costs of preparing a correspondingly suitable surface increase considerably.

It is essential for the disk shown in FIG. 3, which acts as a pressure absorption element 16, that oxygen be able to diffuse comparatively rapidly through the pressure absorption element 16 and a sufficient flow resistance be nevertheless present during the passage through the element 16, so that the measuring electrode 4 can be operated in the limiting current range and pressure surges, which propagate to the measuring electrode 4 and would cause a change in the oxygen partial pressure, are avoided at the same time.

At the same time, the pressure absorption element 16 is configured such that this cannot absorb any liquid, and it is irrelevant whether this liquid originates from the outside through the capillary 15 or from the inside from the electrolyte 7.

The function of the electrochemical sensor shown in FIG. 3 for detecting the percentage of oxygen in an air flow is based on the fact that the oxygen contained in the air is reduced at the measuring electrode 4. The oxygen is reduced here according to the reaction $$O_2 + 2H_2O + 4e^- \rightarrow 4OH^-$$

at the measuring electrode or the oxygen cathode.

The OH⁻ ions formed diffuse through the liquid electrolyte 7 as well as the provided separator nonwovens 8, 12 and are oxidized at the counterelectrode 5 according to the reaction $$2H_2O \rightarrow O_2 + 4H^+ + 4e^-.$$

A current, which is proportional to the concentration of the oxygen contained in the air flow, flows between the two electrodes 4, 5. Due to the provision of a reference electrode 6, which is connected to a potentiostat 10, which is integrated into the measuring and analysis unit 9, it is ensured that a potential of −0.3 V to −0.9 V becomes established at the measuring electrode 4 and a drift of the measured values is prevented in this manner.

If pressure surges (e.g., a pressure wave, in an elevator, pump pulsation, etc.) reach the measuring electrode 4, fluctuations will develop in the oxygen partial pressure at the measuring electrode 4, which leads, in turn, to signal transients.

Due to the provision of the pressure absorption element 16, which covers the capillary 15 on the inner side 14 of the sensor housing 2, the pressure absorption element 16 being in contact with an especially smooth inner surface 18 of the sensor housing 2, pressure surges are prevented in an especially suitable manner from propagating from the capillary 15 to the measuring electrode 4, The pressure absorption element rather ensures that the energy of corresponding pressure surges is absorbed by the pressure absorption element 16 in a suitable manner. Fluctuations in the oxygen partial pressure at the measuring electrode 4, which are caused by such pressure surges and which ultimately lead to signal transients, are thus reliably avoided.

Thus, the present invention is based on the surprising discovery that the described pressure absorption element 16 also functions when it is arranged on the inner side 14 of the sensor housing 2 between the capillary opening and the measuring electrode 4. Furthermore, it is advantageous in case of such an arrangement that it has special advantages in terms of the manufacture of an electrochemical sensor 1 for detecting the percentage of oxygen in a gas mixture. When manufacturing a corresponding sensor 1, the pressure absorption element 16 can thus be fixed together with the measuring electrode 4 in front of the capillary 15, so that the otherwise provided working step of applying a corresponding pressure absorption element 16 to the capillary 15 on the outer side of the sensor housing 2, especially by bonding, can be eliminated.

Since the pressure absorption element 16 provided hitherto on the outer side of the sensor housing 2 on the capillary opening is partially removed or there is a risk of such a removal, the arrangement of the pressure absorption element 16 on the inner side 14 of the sensor housing 2 has, furthermore, the advantage that this arrangement leads to a simplification and hence to safe performance of the assembly and ultimately to an increase in product safety.

It is especially advantageous for the extinction of pressure surges by the pressure absorption element 16, which covers the capillary 15 on the inner side of the sensor housing 2, that when the pressure absorption element 16 is inserted behind the capillary 15, the surface of the contacted inner surface 18 of the sensor housing is extremely smooth. This can be achieved, for example, when the corresponding surface is polished in the injection mold. On the inner side 14, on which the pressure absorption element 16 lies, the corresponding surface of the sensor housing 2 should preferably have a mean roughness depth $R_z$ that is lower than or equal to 5 μm. A further improvement of the extinction of pressure surges is achieved in case of surfaces with a mean roughness $R_z$ that assumes a value lower than or equal to 1 μm. If surfaces having a greater roughness are used, this leads, in turn, to the propagation of pressure surges to the measuring electrode, which leads to changes in the oxygen partial pressure at the measuring electrode and to the signal transients associated therewith.

While specific embodiments of the invention have been shown and described in detail to illustrate the application of the principles of the invention, it will be understood that the invention may be embodied otherwise without departing from such principles.

The invention claimed is:

1. An electrochemical gas sensor for measuring gaseous components in an air and/or gas mixture, the electrochemical gas sensor comprising:
   a sensor housing;
   a measuring electrode arranged in the sensor housing;
   a counter electrode arranged in the sensor housing;
   an electrolyte located between the measuring electrode and the counter electrode;
   a diffusion barrier associated with the sensor housing and configured such that a specifically settable gas flow of the air and/or gas mixture intended for a concentration determination can be fed to the measuring electrode from a surrounding area, the diffusion barrier comprising one or more capillaries, the one or more capillaries having a capillary opening; and
   at least one gas-permeable, hydrophobic pressure absorption element covering the diffusion barrier in an interior of the sensor housing and which lies on an inner surface of the sensor housing, wherein the at least one pressure absorption element surrounds an entire circumference of the capillary opening, wherein the at least one pressure absorption element is provided between the diffusion barrier and the measuring electrode, wherein the inner surface has a mean roughness depth that is lower than or equal to 2 μm at least in an area on which the at least one pressure absorption element lies, the at least one pressure absorption element being configured to dampen or absorb pressure surges propagating to the measuring electrode, the at least one pressure absorption element comprising a first pressure absorption element surface and a second pressure absorption element surface, the second pressure absorption element surface being located opposite the first pressure absorption element surface, the second pressure absorption element surface being located at a distance from the measuring electrode and each and every portion of the second pressure absorption element surface being free of contact with the sensor housing, wherein a space between the second pressure absorption element surface and the measuring electrode is filled with fluid.

2. The electrochemical gas sensor in accordance with claim 1, wherein the mean roughness depth of the inner surface is lower than or equal to 1 μm at least in an area on which the at least one pressure absorption element lies, the capillary opening being located at one end of the one or more capillaries, the capillary opening defining an endmost outlet of the one or more capillaries, the endmost outlet defining a final exit for the fluid to exit directly from the one or more capillaries into an interior space of the sensor housing in which the measuring electrode, the counter electrode and the electrolyte are arranged, the at least one pressure absorption element being arranged between the capillary opening and the measuring electrode.

3. The electrochemical gas sensor in accordance with claim 1, wherein the mean roughness depth of the inner surface is lower than or equal to 0.5 µm in an area on which the at least one pressure absorption element lies, the capillary opening being arranged in a center area of the sensor housing.

4. The electrochemical gas sensor in accordance with claim 1, wherein the diffusion barrier comprises a diffusion barrier outlet end, the at least one pressure absorption element covering the diffusion barrier outlet end, the inner surface being arranged on an inner side of the sensor housing defining a space in which the measuring electrode is arranged, the sensor housing comprising an interior space in which the measuring electrode is arranged, the second pressure absorption element surface extending parallel to a longitudinal axis of the at least one pressure absorption element, the second pressure absorption element surface being only in contact with the fluid in the interior space, the first pressure absorption element surface being in contact with the inner surface, the second pressure absorption element surface extending from one end of the at least one pressure absorption element to another end of the pressure absorption element.

5. The electrochemical gas sensor in accordance with claim 1, wherein the at least one pressure absorption element comprises a thermoplastic fluoroplastic, the sensor housing comprising an electrochemical cell interior space, the inner surface defining at least a portion of the electrochemical cell interior space, the measuring electrode, the counter electrode, the electrolyte, and the at least one pressure absorption element being arranged in the electrochemical cell interior space, the second pressure absorption element surface extending from one end of the at least one pressure absorption element to another end of the pressure absorption element, each and every portion of the second pressure absorption element surface being in contact with the fluid.

6. The electrochemical gas sensor in accordance with claim 5, wherein the at least one pressure absorption element comprises polytetrafluoroethylene, the diffusion barrier comprising a diffusion barrier outlet located adjacent to a portion of the at least one pressure absorption element, the air and/or gas mixture entering the electrochemical cell interior space via the diffusion barrier outlet, each and every portion of the second pressure absorption element surface defining at least a portion of the space.

7. The electrochemical gas sensor in accordance with claim 5, wherein the at least one pressure absorption element comprises polyfluoroethylene propylene, at least the measuring electrode and each and every portion of the second pressure absorption element surface defining the space.

8. The electrochemical gas sensor in accordance with claim 1, wherein the at least one pressure absorption element comprises glass, quartz, silicate, carbon aluminosilicate or any combination of glass, quartz, silicate, carbon and aluminosilicate, the sensor housing comprising an interior space, the interior space defining a common space in which the at least one pressure absorption element and the measuring electrode are arranged.

9. The electrochemical gas sensor in accordance with claim 1, wherein the at least one pressure absorption element is configured at least partly as a nonwoven or as a molding or as both a nonwoven and a molding, the diffusion barrier comprising a diffusion barrier outlet end, the diffusion barrier outlet end comprising the capillary opening, the capillary opening being located in the interior of the sensor housing, the at least one pressure absorption element being located between the measuring electrode and the diffusion barrier outlet end.

10. The electrochemical gas sensor in accordance with claim 1, further comprising a reference electrode arranged in the electrolyte and provided in the sensor housing, the measuring electrode, the counter electrode and the electrolyte being provided in an interior space of the sensor housing, the inner surface defining at least a portion of the interior space, wherein only one side of the at least one pressure absorption element is in contact with the sensor housing and each remaining side of the at least one pressure absorption element is only in contact with the fluid in the interior space of the sensor housing.

11. The electrochemical gas sensor in accordance with claim 1, wherein:
   the sensor housing comprises a plastic molded pot-shaped sensor housing cover part, manufactured from a plastic by means of an injection molding process;
   the one or more capillaries passes through the pot-shaped sensor housing cover part, and the capillary opening is located in the interior of the sensor housing; and
   the entire circumference of the capillary opening is surrounded by the at least one pressure absorption element on an inner side of the pot-shaped sensor housing cover part.

12. A device for measuring gaseous components in an air and/or gas mixture, the device comprising:
   an electrochemical sensor comprising: a sensor housing; a measuring electrode arranged in the sensor housing; a counter electrode arranged in the sensor housing; an electrolyte located between the measuring electrode and the counter electrode; a diffusion barrier comprising at least one capillary defining a gas passage through the sensor housing and configured such that a specifically settable gas flow of the air and/or gas mixture intended for a concentration determination can be fed to the measuring electrode from a surrounding area, the at least one capillary having a capillary opening; and at least one gas-permeable, hydrophobic pressure absorption element covering the diffusion barrier in an interior of the sensor housing and which lies on an inner surface of the sensor housing and is provided between the diffusion barrier and the measuring electrode, the at least one pressure absorption element surrounding an entire circumference of the capillary opening, wherein the inner surface has a mean roughness depth that is lower than or equal to 2 µm at least in an area on which the at least one pressure absorption element lies, the at least one pressure absorption element comprising a first pressure absorption element surface and a second pressure absorption element surface, the second pressure absorption element surface being located opposite the first pressure absorption element surface, the second pressure absorption element surface being located at a distance from the measuring electrode and each and every portion of the second pressure absorption element surface being free of contact with the sensor housing, wherein a space between the second pressure absorption element surface and the measuring electrode is filled with fluid; and
   a measuring and analysis unit, which is connected to the measuring electrode and to the counter electrode and which generates a measured signal representing a gas concentration in the air and/or gas mixture as a function of a change in potential at the counter electrode, the at least one pressure absorption element being configured to dampen or absorb pressure surges propagating to the measuring electrode.

13. The device in accordance with claim 12, further comprising a display unit connected to the measuring and analysis unit wherein the display unit outputs information on the gas concentration as a function of the measured signal.

14. The device in accordance with claim 12, wherein the mean roughness depth of the inner surface is lower than or equal to 1 μm at least in an area on which the at least one pressure absorption element lies, the electrolyte, the measuring electrode and the counter electrode being located in an interior space of the sensor housing, the capillary opening being located at one end of the at least one capillary, the capillary opening defining an endmost outlet of the at least one capillary, the endmost outlet defining a final exit for the fluid to exit directly from the at least one capillary into an interior space of the sensor housing in which the measuring electrode, the counter electrode and the electrolyte are arranged, the at least one pressure absorption element being arranged between the capillary opening and the measuring electrode, wherein only one side of the at least one pressure absorption element is in contact with the sensor housing and each remaining side of the at least one pressure absorption element is only in contact with the fluid in the interior space of the sensor housing.

15. The device in accordance with claim 12, wherein the electrolyte, the measuring electrode and the counter electrode are located in an interior space of the sensor housing, wherein only one side of the at least one pressure absorption element is in contact with the sensor housing and each remaining side of the at least one pressure absorption element is only in contact with the fluid in the interior space of the sensor housing.

16. The device in accordance with claim 12, wherein the at least one pressure absorption element comprises a thermoplastic fluoroplastic, the sensor housing comprising an electrochemical cell interior space, the inner surface defining at least a portion of the electrochemical cell interior space, the measuring electrode, the counter electrode, the electrolyte, and the at least one pressure absorption element being arranged in the electrochemical cell interior space, the second pressure absorption element surface extending parallel to a longitudinal axis of the at least one pressure absorption element, the second pressure absorption element surface being only in contact with the fluid in the electrochemical cell interior space, the first pressure absorption element surface being in contact with the inner surface, the second pressure absorption element surface extending from one end of the at least one pressure absorption element to another end of the at least one pressure absorption element.

17. The device in accordance with claim 12, wherein the at least one pressure absorption element comprises glass, quartz, silicate, carbon and/or aluminosilicate or any combination of glass, quartz, silicate, carbon and aluminosilicate, the diffusion barrier comprising a diffusion barrier outlet located adjacent to a portion of the at least one pressure absorption element, the air and/or gas mixture entering an interior space of the sensor housing via the diffusion barrier outlet, the second pressure absorption element surface extending from one end of the at least one pressure absorption element to another end of the at least one pressure absorption element, each and every portion of the second pressure absorption element surface being in contact with the fluid.

18. The device in accordance with claim 12, wherein the at least one pressure absorption element is configured at least partly as a nonwoven and/or as a molding or as both a nonwoven and a molding, the diffusion barrier comprising a diffusion barrier outlet end, the at least one pressure absorption element being located between the measuring electrode and the diffusion barrier outlet end, the diffusion barrier outlet end comprising the capillary opening, the capillary opening being located in the interior of the sensor housing, at least the measuring electrode and each and every portion of the second pressure absorption element surface defining the space.

19. The device in accordance with claim 12, wherein the electrochemical sensor further comprises a reference electrode arranged in the electrolyte and provided in the sensor housing, the sensor housing comprising an interior space, the interior space defining a common space in which at least the at least one pressure absorption element and the measuring electrode are arranged, the capillary opening being arranged in a center area of the sensor housing.

20. The device in accordance with claim 12, wherein:
the sensor housing comprises a plastic molded pot-shaped sensor housing cover part, manufactured from a plastic by injection molding;
the at least one capillary passes through the pot-shaped sensor housing cover part; and
the entire circumference of the capillary opening is covered by the at least one pressure absorption element on an inner side of the pot-shaped sensor housing cover part.

* * * * *